United States Patent [19]

Hirota

[11] 4,431,537

[45] Feb. 14, 1984

[54] REVOLVING CONTACTORS FOR THE BIOLOGICAL TREATMENT OF WASTE WATER

[76] Inventor: Tetsuji Hirota, 3-10, Fukumura, Komono-cho, Mie-gun, Mie-ken, Japan

[21] Appl. No.: 452,900

[22] Filed: Dec. 27, 1982

[51] Int. Cl.[3] .............................................. C02F 1/74
[52] U.S. Cl. ..................................... 210/150; 261/92
[58] Field of Search ...................... 210/150, 151, 493.4; 261/92; 29/157.3 D; 165/170, 166; 428/593, 594, 604

[56] References Cited

U.S. PATENT DOCUMENTS

| | | | |
|---|---|---|---|
| 3,498,372 | 3/1970 | Patten et al. | 165/166 |
| 3,931,854 | 1/1976 | Ivakhnenko et al. | 165/166 |
| 4,115,268 | 9/1978 | Thissen | 210/150 |

*Primary Examiner*—Charles N. Hart
*Assistant Examiner*—W. Gary Jones
*Attorney, Agent, or Firm*—Oblon, Fisher, Spivak, McClelland & Maier

[57] ABSTRACT

A rotating biological contactor for the treatment of waste water comprises the first and second elongate sheets of an equal width spirally wound in multiple turns on a rotatable shaft in a superimposed relation to each other to form a convolute, the first sheet being corrugated with transversely alternately arranged longitudinal rows of deep and shallow corrugations having an equal longitudinal pitch whereby the apexes of the deep corrugations are transversely in alignment with the apexes of the shallow corrugations, with the apexes of the shallow corrugations constituting transversely spaced valleys between the respective adjacent apexes of the deep corrugations, the second sheet being generally flat and provided with embossed longitudinal ridges which fit in the valleys of the first sheet.

10 Claims, 6 Drawing Figures

REVOLVING CONTACTORS FOR THE BIOLOGICAL TREATMENT OF WASTE WATER

BACKGROUND OF THE INVENTION

The present invention relates to a rotating contactor for the biological treatment of waste water.

For the biological treatment of waste water, it is common to use rotating contactors or rotors which are partially submerged in the waste water and adapted to slowly rotate to expose the waste water to the atmosphere or air, whereby organic substances in the waste water are biologically oxidized or treated by the action of the aerobic micro-organisms. A typical rotating contactor is disclosed in U.S. Pat. No. 4,115,268. The contactor comprises an elongate plastic sheet spirally wound in multiple turns on a rotatable shaft in a superimposed relation to each other to form a convolute. The plastic sheet is provided with cup-shaped irregularities to define peripheral flow channels between the turns in the convolute. It is also known to prepare a rotating contactor by spirally winding two elongate plastic sheets at least one of which has embossed patterns to provide flow channels between the sheets. Various structures have been proposed from such elongate plastic sheets.

Such elongate sheets are required to have adequate flexibility in the longitudinal direction so that they can be wound readily on the rotating shaft. At the same time they are required to have sufficient rigidity in the axial or transverse direction. When they are spirally wound on the shaft, they must provide a sufficient number of flow channels which are continuous in both the circumferential and axial directions and yet the spirally wound structure must have adequate radial compressive strength to bear the weight of the biological slime deposited on the sheets and the weight of the sheets themselves. Further, the plastic sheets are required to be readily wound in a simple and efficient means. For instance, there used to be a problem that two different kinds of elongate sheets are likely to be displaced in the transverse direction at the time of winding the sheets on the shaft. Furthermore, it is desired that they can be prepared at a low production cost. None of the conventional contactors adequately satisfy these various requirements.

SUMMARY OF THE INVENTION

Accordingly, it is an object of the present invention to provide a rotating contactor which can economically readily be prepared from elongate sheets having adequate longitudinal flexibility, transverse rigidity and mechanical strength and which provides adequate flow channels for air and waste water and sufficient contact surface areas.

Thus, the present invention provides a rotating contactor for the biological treatment of waste water, which comprises the first and second elongate sheets of an equal width spirally wound in multiple turns on the rotatable shaft in a superimposed relation to each other to form a convolute. The first sheet is corrugated with transversely alternately arranged longitudinal rows of deep and shallow corrugations having an equal longitudinal pitch whereby the apexes of the deep corrugations are transversely in alignment with the apexes of the shallow corrugations, with the apexes of the shallow corrugations constituting transversely spaced valleys between the respective adjacent apexes of the deep corrugations. The second sheet is generally flat and provided with embossed longitudinal ridges which fit in the valleys of the first sheet.

BRIEF DESCRIPTION OF THE DRAWINGS

Now, the present invention will be described with reference to a preferred embodiment illustrated in the accompanying drawings.

DETAILED DESCRIPTION OF THE PREFERRED EMBODIMENTS

Figure 1:
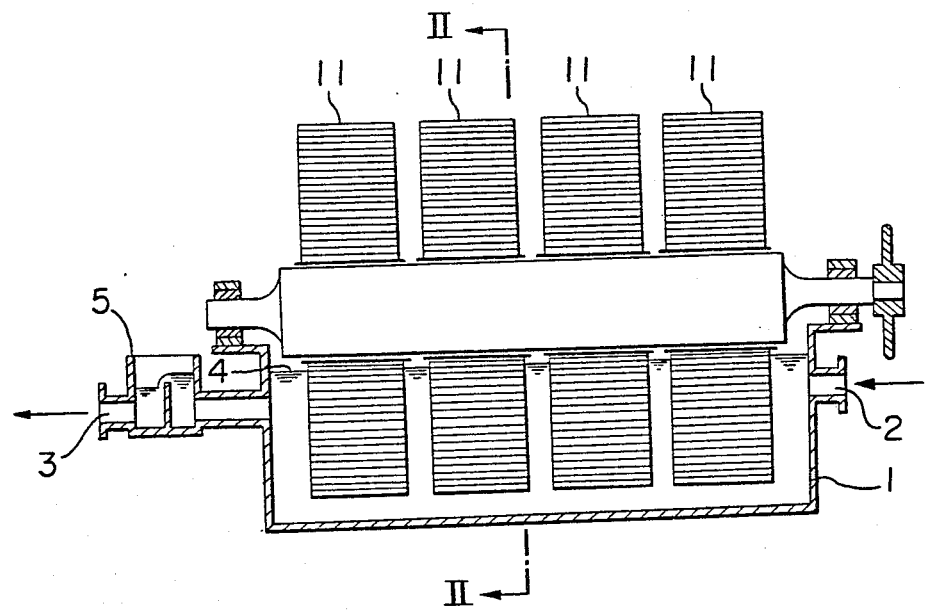
FIG. 1 is a longitudinal cross sectional view of a waste water biological treatment system in which the rotating contactors of the present invention are used.
Figure 2:
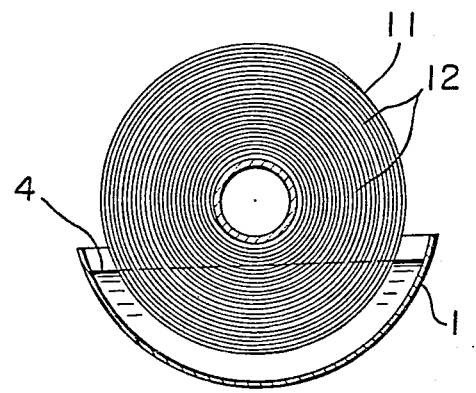
FIG. 2 is a cross sectional view taken along the line II—II of FIG. 1.

Referring to FIGS. 1 and 2, waste water to be treated is continuously introduced into a waste water tank 1 through a waste water inlet 2 thereof and subjected to biological oxidation treatment as it passes through the spaces 12 in the convolute of a rotating contactor 11. The treated water is continuously discharged from a treated water outlet 3. The water level 4 in the tank 1 is maintained at a predetermined level by a level controller 5 provided at the treated water outlet 3, so that about 40% of the rotating contactor 11 is immersed in the waste water.

Figure 3:
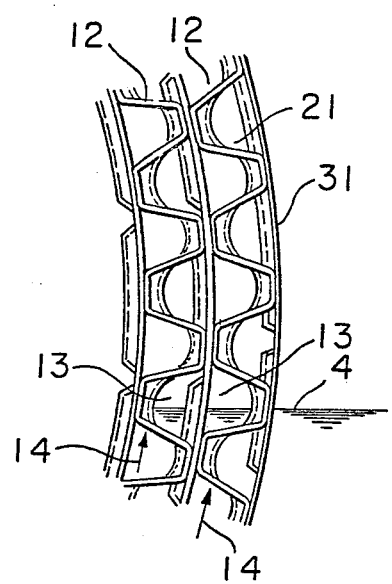
FIG. 3 is an enlarged partial view of FIG. 2.

Referring to FIG. 3, the reference numeral 12 indicates the spaces between the first and second plastic sheets. As the contactor 11 rotates, the waste water flows through circumferential flow channels 14 while moving along axial row channels 13 whereby it is brought in contact with the contactor 11 and as the contactor emerges from the water level, the waste water forms a water film on the contactor. Thus, the water film is exposed to air and thereby biologically oxidized.

Figure 4:
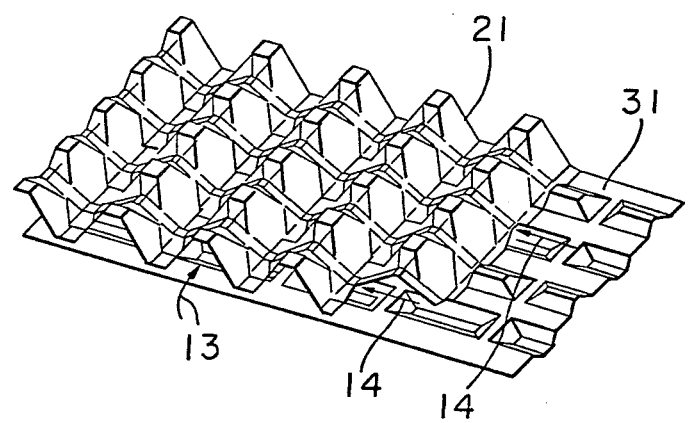
FIG. 4 is a partially broken perspective view illustrating the combination of the two sheets to be used for the preparation of the rotating contactor as shown in FIG. 1.
Figure 5:
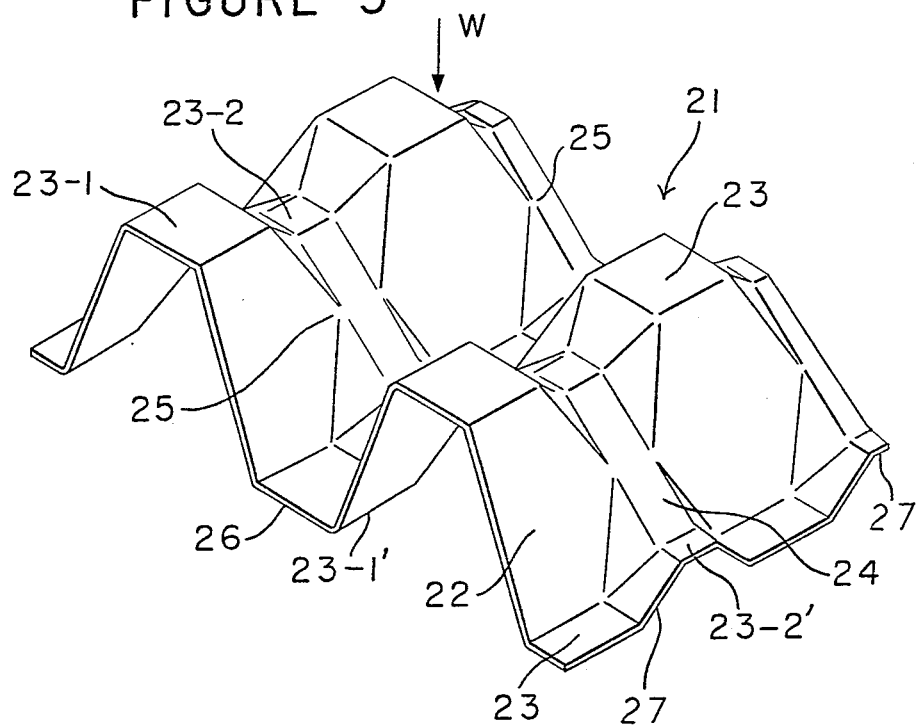
FIG. 5 is an enlarged partial view of the first sheet.
Figure 6:
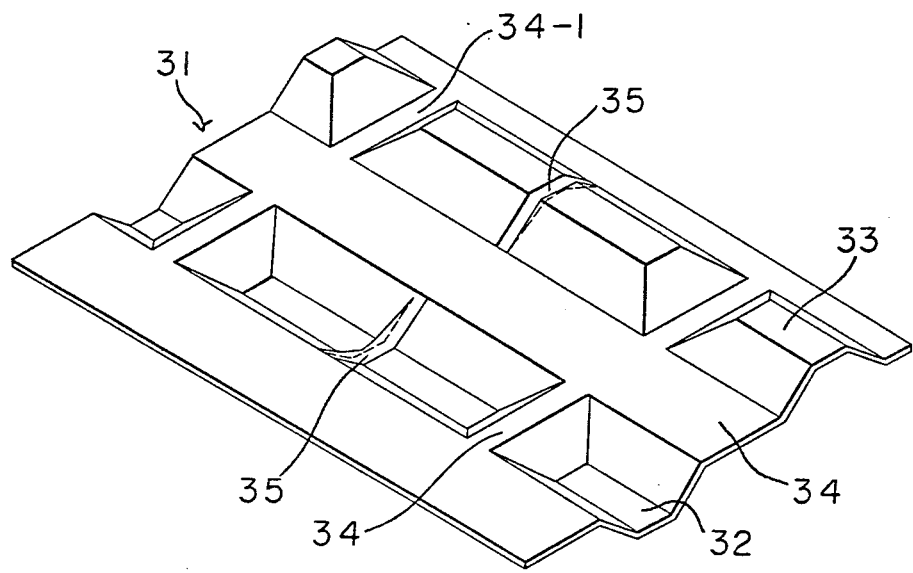
FIG. 6 is an enlarged partial view of the second sheet.

Referring to FIGS. 4 to 6, the axial flow channels 13 and the circumferential flow channels 14 constituting the spaces 12 are formed by the first sheet 21 and the second sheet 31 in the following manner.

As shown in FIG. 5, the first sheet 26 is corrugated with transversely alternately arranged longitudinal rows of deep corrugations 22 and shallow corrugations 24. The deep and shallow corrugations having an equal longitudinal pitch and the same cycle whereby the apexes 23-1 and 23-1' of the deep corrugations 22 are transversely in alignment with the apexes 23-2 and 23-2' of the shallow corrugations 24 whereby the apexes 23-2 and 23-2' of the shallow corrugations 24 constitute transversely spaced valleys between the respective adjacent apexes 23-1 and 23-1' of the deep corrugations 22, respectively.

In the illustrated preferred embodiment, the longitudinal rows of deep and shallow corrugations are transversely alternately arranged with an equal pitch and the same cycle. Namely, the first sheet is corrugated with transversely equally spaced longitudinal rows of longitudinally alternately arranged relatively deep concavities and convexities and transversely equally spaced rows of longitudinally alternately arranged relatively shallow concavities and convexities. The rows of the relatively deep concavities and convexities and the rows of relatively shallow concavities and convexities are transversely alternately and continuously arranged. The deep concavities and convexities and the shallow concavities and convexities are longitudinally arranged with an equal pitch and the same cycle so that the deep concavities and convexities are transversely in alignment with the shallow concavities and convexities, respectively, to form transverse corrugations, whereby the apexes 23-2′ of the shallow concavities and the apexes 23-2 of the shallow convexities constitute valleys between the respective adjacent deep concavities and convexities.

At the apexes 23-1 and 23-1′ of the deep corrugations, there are provided small flat surfaces which are to be welded to adjacent second sheet 31 as described hereinafter. The portions connecting apexes 23-1 and 23-1′ of the deep corrugations 22 to the apexes 23-2 and 23-2′ of the shallow corrugations 24 are gently rounded to form curved surfaces and along a transverse straight lines at a ½ height of each of the deep and shallow corrugations, an oblique flat surface having a minimum width extends to form a neutral plane 25 for longitudinal bending whereby the first sheet has adequate flexibility and thereby can readily be wound on a rotatable shaft having any diameter.

The corrugations 22 and 24 or convexities and concavities can readily be formed by thermal forming. For instance, the first sheet is made from a polyethylene sheet having a thickness of about 2 mm by thermal forming so that the deep corrugations 22 have a depth of about 42 mm, the longitudinal pitch between the apexes 23-1 of the deep corrugations is 70 mm, the transverse pitch of the apexes 23-1 of the deep corrugations is 50 mm and the shallow corrugations 24 have a depth of ½ of the depth of the deep corrugations 22. The first sheet thus prepared has adequate compressive strength against a force applied perpendicular to the first sheet and an extremely large surface area. The contact surface area can thereby be made as large as at least 200% of a surface area of a flat sheet of the same size.

Now, referring to FIG. 6, the second sheet 31 is generally flat and provided with embossed longitudinal ridges 33 which are designed to fit in the valleys 27 of the first sheet 21. In the illustrated preferred embodiment, the second sheet is also provided with longitudinal grooves 32 which are designed to form, together with the valleys 27 of the first sheet, flow channels 14 for the waste water. It should be noted that the back side or opposite side of each ridge constitute a groove and likewise the back side or opposite side of each groove constitutes a ridge. The longitudinal ridges 33 and the longitudinal grooves 32 of the second sheet 31 are transversely alternately arranged with an equal pitch corresponding to the transverse pitch of the valleys of the first sheet 21. The flat portions 34-1 are provided between the adjacent ridges or the adjacent grooves to provide adequate flexibility in the longitudinal direction. To ensure the longitudinal flexibility of the second sheet, the shallow grooves 35 are transversely provided at the center portions of the ridges 33 and grooves 32. The longitudinal pitches of the ridges 33 and the grooves 32 are different from the longitudinal pitch of the corrugations of the first sheet 21 so as to avoid the possiblity that the flat portions 34-1 ever constrict the circumferential flow channels 14.

The first sheet 21 and the second sheet 31 are superimposed as shown in FIG. 4. When they are wound on a rotatable shaft with one of them being ahead of the other by 180° around the rotatable shaft, the transverse distance between the ridges and grooves of the second sheet 31 coincide with the transverse distance of the valleys 27 of the first sheet 21, and the cross sectional shape of each ridge or groove substantially corresponds to the cross sectional shape of the valley 27 formed by the deep corrugations 22 and the shallow corrugations 24 of the first sheet. Each ridge 33 fits in a valley of the following or subsequent turn of the first sheet 21 and the back side i.e. the protruded side of each groove, which constitutes a ridge 33 as mentioned above, fits in a valley of the preceding turn of the first sheet 21. At the same time, the back side i.e. the grooved side of each ridge forms, together with a valley of the preceding turn of the first sheet 21, a flow channel 14 having a generally circular cross section, likewise, each groove 32 forms, together with a valley of the following turn of the first sheet 21, a flow channel 14 having a generally circular cross section. The apexes 23-1 and 23-1′ of the first sheet are brought in contact with the flat portions 34 of the second sheet. These contacting portions may advantageously be welded to each other to increase the rigidity of the convolute structure.

The second sheet 31 may advantageously be made of the same plastic material as mentioned above with respect to the first sheet. The actual dimensions of the second sheet may, for instance, be such that the height from the bottom surfaces of the grooves to the top surfaces of the ridges is about 21 mm, the transverse distance between the adjacent ridges and grooves is 50 mm and longitudinal distance between the adjacent ridges or the adjacent grooves is 95 mm, whereby good results can be obtained.

According to the present invention, the first and the second sheets are securely engaged with each other by the fit-in relation of the valleys of the first sheet with the ridges of the second sheet, whereby transverse slip of the sheet can be avoided. By virtue of the fit-in relation, the winding operation of the sheets to form a convolute structure is facilitated. Since adequate rigidity or dimensional stability of the convolute structure is thereby assured, the welding of the multiple turns of the sheet in the convolute, which used to be essential in the conventional rotating contactors, can be eliminated, whereby the operation to form the convolute structure is further facilitated. The welding is required only at the inner and outer end portions of the spirally wound convolute. This is particularly advantageous in that one of the sheets can readily be replaced by a fresh one. However, as mentioned above, the first sheet can be welded to the second sheet at the apexes of the deep corrugations of the first sheet to increase the structural rigidity of the convolute.

It should also be appreciated that according to the present invention, the rotating contactor has an extremely large contact surface per unit volume and flow channels extend in both the circumferential and axial directions and yet the contactor has adequate strength. The convolute structure of the present invention may also be applied to other gas-liquid contacting apparatus or metallic plate type heat exchangers.

What is claimed as new and desired to be secured by Letters Patent of the United States is:

1. A rotating biological contactor for the treatment of waste water, comprising the first and second elongate sheets of an equal width spirally wound in multiple turns on a rotatable shaft in a superimposed relation to each other to form a convolute, the first sheet being corrugated with transversely alternately arranged longitudinal rows of deep and shallow corrugations having an equal longitudinal pitch whereby the apexes of the deep corrugations are transversely in alignment with the apexes of the shallow corrugations, with the apexes of the shallow corrugations constituting transversely spaced valleys between the respective adjacent apexes of the deep corrugations, the second sheet being generally flat and provided with embossed longitudinal ridges which fit in the valleys of the first sheet.

2. The rotating biological contactor according to claim 1 wherein the second sheet is also provided with longitudinal grooves which form, together with the valleys of the first sheet, circumferential flow channels for the waste water.

3. The rotating biological contactor according to claim 2 wherein the longitudinal ridges and the longitudinal grooves of the second sheet are transversely alternately arranged.

4. The rotating biological contactor according to claim 1 wherein the longitudinal rows of deep and shallow corrugations are transversely alternately arranged with an equal pitch and the same cycle.

5. The rotating biological contactor according to claim 1 wherein the first and second sheets are welded to each other at their inner and outer end portions of the spirally wound convolute.

6. The rotating biological contactor according to claim 5 whereifn the first sheet is welded to the second sheet at the apexes of the deep corrugations.

7. A rotating biological contactor for the biological treatment of waste water, comprising the first and second elongate sheets of an equal width spirally wound in multiple turns on a rotatable shaft in a superimposed relation to each other to form a convolute, the first sheet being corrugated with transversely equally spaced longitudinal rows of longitudinally alternately arranged relatively deep concavities and convexities and transversely equally spaced rows of longitudinally alternately arranged relatively shallow concavities and convexities, said rows of the relatively deep concavities and convexities and said rows of the relatively shallow concavities and convexities being transversely alternately and continuously arranged, the deep concavities and convexities and the shallow concavities and convexities being longitudinally arranged with an equal pitch so that the deep concavities and convexities are transversely in alignment with the shallow concavities and convexities, respectively, to form transverse corrugations with the apexes of the shallow concavities and convexities constituting valleys between the respective adjacent deep concavities and convexities, the second sheet being generally flat and provided with transversely equally spaced longitudinal convexities and transversely equally spaced longitudinal concavities, said longitudinal convexities and said longitudinal concavities are transversely alternately arranged with a distance equal to the transverse distance of the longitudinal rows of the shallow concavities and convexities of the first sheet, said first sheet being superimposed on the second sheet with the longitudinal convexities of the second sheet fitting in the corresponding valleys of the first sheet and with the longitudinal concavities of the second sheet forming flow channels together with the corresponding valleys of the first sheet.

8. The rotating biological contactor according to claim 7 wherein the first and second sheets are welded to each other at their inner and outer end portions of the spirally wound convolute.

9. The rotating biological contactor according to claim 8 wherein the first sheet is welded to the second sheet at the apexes of the relatively deep concavities and convexities.

10. A waste water biological treatment system comprising a rotatable shaft and a plurality of rotating contactors mounted on the shaft in closely spaced relation to each other, each rotating contactor comprising the first and second elongate sheets of an equal width spirally wound in multiple turns on the rotatable shaft in a superimposed relation to each other to form a convolute, the first sheet being corrugated with transversely alternately arranged longitudinal rows of deep and shallow corrugations having an equal longitudinal pitch whereby the apexes of the deep corrugations are transversely in alignment with the apexes of the shallow corrugations, with the apexes of the shallow corrugations constituting transversely spaced valleys between the respective adjacent apexes of the deep corrugations, the second sheet being generally flat and provided with embossed longitudinal ridges which fit in the valleys of the first sheet.

* * * * *

UNITED STATES PATENT AND TRADEMARK OFFICE
CERTIFICATE OF CORRECTION

PATENT NO. : 4,431,537

DATED : February 14, 1984

INVENTOR(S) : TETSUJI HIROTA

It is certified that error appears in the above-identified patent and that said Letters Patent is hereby corrected as shown below:

The title should read:

- - [54] ROTATING BIOLOGICAL CONTACTORS FOR THE TREATMENT OF WASTE WATER - -

Signed and Sealed this

Fourth Day of December 1984

[SEAL]

Attest:

GERALD J. MOSSINGHOFF

Attesting Officer     Commissioner of Patents and Trademarks